(12) United States Patent
Nakagawa (10) Patent No.: US 7,114,282 B2
(45) Date of Patent: Oct. 3, 2006

(54) ROD CLAMP

(75) Inventor: Shouji Nakagawa, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/897,011

(22) Filed: Jul. 23, 2004

(65) Prior Publication Data

US 2005/0028422 A1    Feb. 10, 2005

(30) Foreign Application Priority Data

Aug. 6, 2003    (JP) ............................. 2003-287255

(51) Int. Cl.
    *A01K 87/06* (2006.01)
(52) U.S. Cl. .......................................................... 43/22
(58) Field of Classification Search .................... 43/22;
    248/49, 58, 62, 74.1
    See application file for complete search history.

(56) References Cited

U.S. PATENT DOCUMENTS

| 484,439 | A | * | 10/1892 | Lockwood | 43/22 |
| 506,607 | A | * | 10/1893 | Ruddock | 43/22 |
| 682,847 | A | * | 9/1901 | Forsyth | 248/74.1 |
| 744,454 | A | * | 11/1903 | Allen | 43/22 |
| 773,703 | A | * | 11/1904 | Bartlett | 43/22 |
| 930,181 | A | * | 8/1909 | Huffman | 43/22 |
| 1,069,937 | A | * | 8/1913 | Goehst et al. | 248/74.1 |
| 1,321,841 | A | * | 11/1919 | Otto | 43/22 |
| 1,341,113 | A | * | 5/1920 | Dottl et al. | 248/74.1 |
| 1,752,027 | A | * | 3/1930 | Pflueger | 43/22 |
| 1,883,041 | A | * | 10/1932 | Somers | 43/22 |
| 1,991,407 | A | * | 2/1935 | Miller et al. | 43/22 |
| 1,995,242 | A | * | 3/1935 | Clarke | 43/22 |
| 2,111,447 | A | * | 3/1938 | Grieten | 43/22 |
| 2,182,468 | A | * | 12/1939 | Coxe | 43/22 |
| 2,198,588 | A | * | 4/1940 | Stephens | 43/22 |
| 2,317,825 | A | * | 4/1943 | Teas, Sr. | 248/62 |
| 2,409,940 | A | * | 10/1946 | Kay | 43/22 |
| 2,699,622 | A | * | 1/1955 | Stevens | 43/22 |
| 2,929,578 | A | * | 3/1960 | Dell | 43/22 |
| 3,185,418 | A | * | 5/1965 | Appleton | 248/74.1 |
| 3,243,151 | A | * | 3/1966 | Varney et al. | 248/74.1 |
| 3,310,264 | A | * | 3/1967 | Appleton | 248/74.1 |
| 3,443,335 | A | * | 5/1969 | Guydos | 43/22 |
| 3,501,859 | A | * | 3/1970 | Perkins | 43/22 |
| 3,792,546 | A | * | 2/1974 | Miller | 43/22 |
| 4,209,155 | A | * | 6/1980 | Florian | 248/62 |
| 4,688,346 | A | * | 8/1987 | Collins | 43/22 |
| 4,815,228 | A | * | 3/1989 | Abel | 43/22 |
| 5,012,607 | A | * | 5/1991 | Meschkat | 43/22 |
| 5,297,890 | A | * | 3/1994 | Commins | 248/74.1 |
| 5,303,885 | A | * | 4/1994 | Wade | 248/62 |
| 5,377,441 | A | * | 1/1995 | Noda | 43/22 |

(Continued)

FOREIGN PATENT DOCUMENTS

EP         819379 A1 *   1/1998

(Continued)

*Primary Examiner*—Darren W. Ark
(74) *Attorney, Agent, or Firm*—Global IP Counselors, LLP (57) ABSTRACT

The rod clamp includes a retaining portion that is curved so that a portion of the outer periphery of a fishing rod contacts with the retaining portion, a first fixing portion and a second fixing portion that are respectively arranged on both sides of the retaining portion, and release portions that are formed in both sides of the outer peripheral surface of the retaining portion so as to be adjacent to the first and second fixing portions. Each of the first and second release portions defines a through hole on the outer peripheral surface of the retaining portion.

15 Claims, 7 Drawing Sheets

U.S. PATENT DOCUMENTS

| | | | | |
|---|---|---|---|---|
| 5,522,571 A * | 6/1996 | Simmons | ................ | 248/62 |
| 5,533,696 A * | 7/1996 | Laughlin et al. | ............ | 248/74.1 |
| 5,557,875 A * | 9/1996 | Testa | ................ | 43/22 |
| 5,839,703 A * | 11/1998 | Tesar | ................ | 248/74.1 |
| 5,915,639 A * | 6/1999 | Farris | ................ | 43/22 |
| 5,956,884 A * | 9/1999 | Goodrich | ................ | 43/22 |
| 5,988,550 A * | 11/1999 | Okui | ................ | 43/22 |
| 6,257,530 B1 * | 7/2001 | Tsai | ................ | 248/74.2 |
| 6,311,935 B1 * | 11/2001 | Mullen, Jr. | ................ | 248/74.1 |
| 6,508,440 B1 * | 1/2003 | Schmidt | ................ | 248/62 |
| 6,591,540 B1 * | 7/2003 | Chargois | ................ | 43/22 |
| 6,783,104 B1 * | 8/2004 | Roth | ................ | 248/49 |

FOREIGN PATENT DOCUMENTS

| | | | | | |
|---|---|---|---|---|---|
| FR | 1103691 A | * | 11/1955 | ................ | 43/22 |
| FR | 2744329 A1 | * | 8/1997 | | |
| GB | 490505 A | * | 8/1938 | ................ | 43/22 |
| JP | 5-15766 U | | 3/1993 | | |
| JP | 11-285334 A | * | 10/1999 | | |
| JP | 2001-69881 A | * | 3/2001 | | |
| JP | 2004-121179 A | * | 4/2004 | | |

* cited by examiner

ROD CLAMP

BACKGROUND OF THE INVENTION

1. Field of the Invention

The present invention relates to a rod clamp. More specifically, the present invention relates to a rod clamp that is adapted to be detachably attached to a reel unit having a rod attachment leg to retain a fishing rod between the rod attachment leg and the rod clamp.

2. Background Information

A rod clamp is detachably attached to a reel unit having a rod attachment leg, and serves to retain a fishing rod between the rod attachment leg and the rod clamp. Known rod clamps include a retaining portion that is curved such that a portion of an outer periphery of the rod will contact therewith, and fixing portions that are arranged on both sides of the retaining portion and include through holes in which bolt members are mounted. This type of rod clamp grasps the fishing rod between the rod attachment leg and the retaining portion, and is fixed to both sides of the rod attachment leg of the reel unit with the bolt members. Japanese Published Utility Model Application H05-15766 discloses an example of such rod clamp.

The aforementioned conventional rod clamp will retain a fishing rod between the rod attachment leg and the rod clamp, and is attached to both sides of the rod attachment leg of the reel unit. In a reel unit to which this type of rod clamp is attached, for example, the length of the spool in the axial direction will be reduced, and the width of the frame of the reel unit will be reduced, in order to make the reel easily operable with one hand. However, when the width of the frame of the reel unit is reduced, the pitch of the screw holes formed in the reel unit used to mount the bolt members of the rod mount will be reduced, and thus the pitch of the through holes of the fixing portions of the rod mount that correspond to the screw holes of the reel unit will also be reduced. In other words, the through holes of the fixing portion are disposed in positions close to both sides of the retaining portion, and thus when the bolt members are mounted in the through holes of the fixing portion, the head portions of the bolt members may interfere with the retaining portion.

In view of the above, it will be apparent to those skilled in the art from this disclosure that there exists a need for an improved rod clamp that overcomes the problems of the conventional art. This invention addresses this need in the art as well as other needs, which will become apparent to those skilled in the art from this disclosure.

SUMMARY OF THE INVENTION

An object of the present invention is to provide a rod clamp that can be attached to a reel unit having a small frame width.

A rod clamp according to a first aspect of the present invention is detachably attached to a reel unit that is adapted to be detachably attached to first and second attachment portions of a reel unit for grasping a fishing rod between the rod clamp and a rod attachment leg of a reel unit. The first and second attachment portions are arranged on both sides of the rod attachment leg of the reel unit. The rod clamp a retaining portion, first and second fixing portions, and first and second release portions. The retaining portion is adapted to grasp the fishing rod between the rod attachment leg and the retaining portion, and has a curved surface that is adapted to contact an outer periphery of the fishing rod. The first and second fixing portions are respectively arranged on both sides of the retaining portion, and are adapted to be coupled to the first and second attachment portions of the reel unit, such that the retaining portion is detachably coupled to the reel unit. The first and second release portions are respectively formed on both sides of an outer peripheral surface of the retaining portion so as to be adjacent to the first and second fixing portions. Each of the first and second release portions defines a concavity on the outer peripheral surface of the retaining portion.

This rod clamp includes a curved retaining portion, first and second fixing portions that are arranged on both sides of the retaining portion, and a first release portion and a second release portion that include cut-outs or recess portions. The cut-outs or recess portions are respectively formed on the sides so as to be adjacent to the first fixing portion and the second fixing portion of the retaining portion. In order to attach this rod clamp to the reel unit, the lower portion of the fishing rod is retained with the retaining portion of the rod clamp while the upper portion of the fishing rod is held by the rod attachment leg of the reel unit. Here, because the rod clamp further includes the first release portion and the second release portion, even with the small-pitched first and second attachment portions of a small-framed reel unit, interference of the first fixing member and the second fixing member with the retaining member can be prevented. Thus, the rod clamp can be reliably attached to a reel unit having a small frame width.

A rod clamp according to a second aspect of the present invention is the rod clamp of the first aspect of the present invention, further including a first and second fixing members respectively adapted to be detachably coupled to the first and second attachment portions of the reel unit via the first and second fixing portions, the first and second fixing members being at least partially disposed within the concavities defined by the first and second release portions when the first and second fixing members are coupled to the first and second attachment portions of the reel unit via the first and second fixing portions. Here, when the first fixing member and the second fixing member are mounted in the first fixing portion and the second fixing portion, because the rod clamp further includes the first release portion and the second release portion in which the first fixing member and the second fixing member can be at least partially inserted, even with the small-pitched first and second attachment portions of the small-framed reel unit, interference of the first fixing member and the second fixing member with the retaining member can be prevented disposing the first fixing member and the second fixing member at least partially in the first release portion and the second release portion. Thus, the rod clamp can be reliably attached to a reel unit having a small frame width.

A rod clamp according to a third aspect of the present invention is the rod clamp of the second aspect of the present invention, in which the first fixing member includes a first shaft portion that is adapted to be screwed into the first attachment portion, and a first head portion that is provided with a diameter larger than that of the first shaft portion, and the second fixing member includes a second shaft portion that is adapted to be screwed into the second attachment portion, and a second head portion that is provided with a diameter larger than that of the second shaft portion. The first head portion is at least partially disposed within the first release portion when the first fixing member is coupled to the first attachment portion of the reel unit via the first fixing portion. The second head portion is at least partially disposed within the second release portion when the second fixing member is coupled to the second attachment portion of the reel unit via the second fixing portion. In this configuration, mounting and fixing can be easily and reliably performed by, for example, forming female threads in the first attachment portion and the second attachment portion, and forming male threads on the shaft portion of the first fixing member and the second fixing member. In addition, interference between the retaining portion and the first and second fixing members can be prevented by partially disposing the head portions of the first fixing member and the second fixing member into the first release portion and the second release portion.

A rod clamp according to a fourth aspect of the present invention is the rod clamp of the second or third aspects of the present invention, the first fixing portion and the second fixing portion include through holes which the first fixing member and the second fixing member respectively pass through.

A rod clamp according to a fifth aspect of the present invention is the rod clamp of any of the first to fourth aspects of the present invention, in which the first release portion and the second release portion are cut-outs.

A rod clamp according to a sixth aspect of the present invention is the rod clamp of any of the second to forth aspects of the present invention, in which the first release portion and the second release portion are cut-outs that are sized to accommodate the first and second head portions of the first and second fixing members when the first and second fixing members are coupled to the first and second attachment portions of the reel unit via the first and second fixing portions. In this configuration, the first release portion and the second release portion are cut-outs that are sized to be larger than the head portions of the first fixing member and second fixing member. Thus, for example it is possible to remove the rod clamp by loosening the first fixing member and the second fixing member, removing only one of the first fixing member and the second fixing member, and sliding the other of the first fixing member and the second fixing member into the corresponding one of the first release portion and the second release portion. Therefore, the rod clamp can be mounted and removed without completely removing one of the first fixing member and the second fixing member.

A rod clamp according to a seventh aspect of the present invention is the rod clamp of the fourth aspect of the present invention, in which the first release portion and the second release portion are integrally formed with the through holes of the first fixing portion and the second fixing portion respectively. In this configuration, workability can be improved because both of the first release portion and the second release portion and the through holes of the first fixing portion and the second fixing portion can be formed as one long hole.

A rod clamp according to an eighth aspect of the present invention is the rod clamp of the seventh aspect of the present invention, in which the first release portion and the second release portion are cut-outs. In this configuration, workability can be improved because both cut-outs of the first release portion and the second release portion and the through holes of the first fixing portion and the second fixing portion can be formed as one long hole.

A rod clamp according to a ninth aspect of the present invention is the rod clamp of any of the first to eighth aspects of the present invention, in which the retaining portion, the first fixing portion and the second fixing portion are made of a stainless steel alloy. In this configuration, the strength and corrosion resistance of the retaining portion, the first fixing portion, and the second fixing portion can be maintained at a high level.

A rod clamp according to a tenth aspect of the present invention is the rod clamp of any of the first to ninth aspects of the present invention, in which the retaining portion, the first fixing portion and the second fixing portion are unitarily formed as a one-piece member by press working. In this configuration, the formation of the retaining portion, the first fixing portion, and the second fixing portion will be simplified by means of press working a sheet metal member.

A rod clamp according to an eleventh aspect of the present invention is the rod clamp of any of the second to tenth aspects of the present invention, in which the first fixing member includes a first shaft portion, a first head portion that is provided with a diameter larger than that of the first shaft portion, and a first nut portion to which the first shaft portion is screwed such that the first nut portion is at least partially disposed within the first release portion when the first fixing member is coupled to the first attachment portion of the reel unit via the first fixing portion, and the second fixing member includes a second shaft portion, a second head portion that is provided with a diameter larger than that of the second shaft portion, and a second nut portion to which the second shaft portion is screwed such that the second nut portion is at least partially disposed within the second release portion when the second fixing member is coupled to the second attachment portion of the reel unit via the second fixing portion.

A rod clamp according to a twelfth aspect of the present invention is the rod clamp of any of the second to eleventh aspects of the present invention, in which the first and second release portions are recess portions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
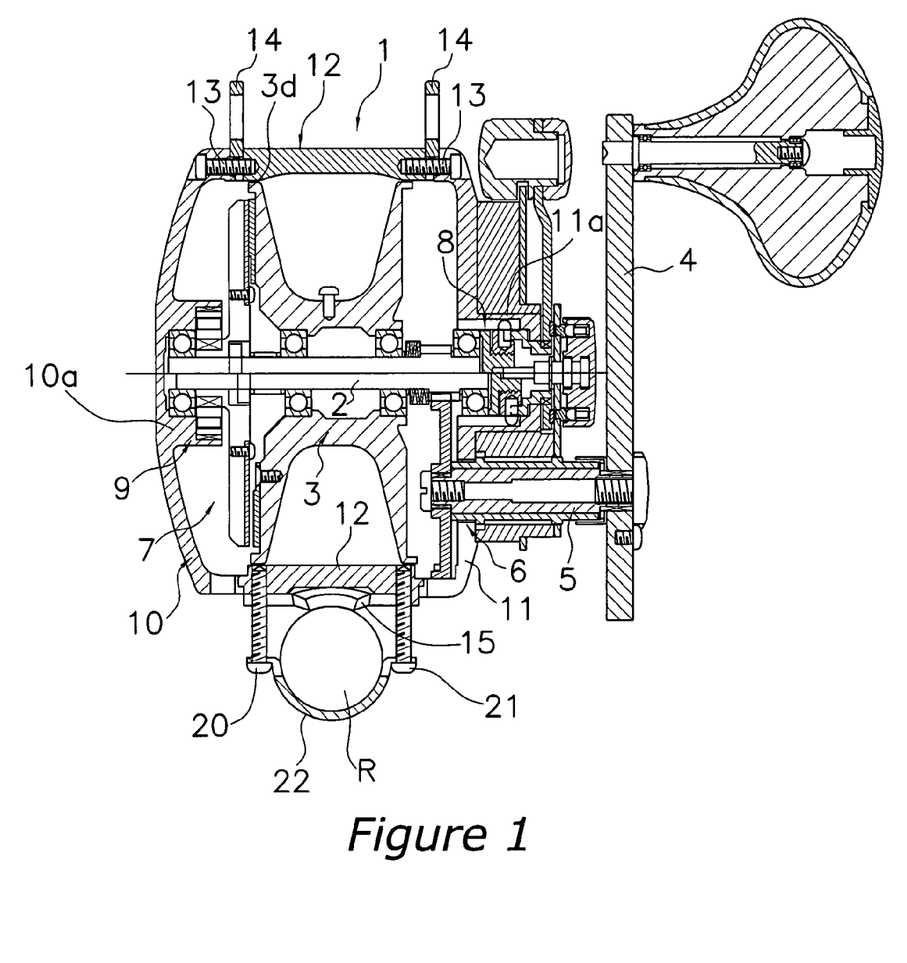
FIG. 1 is a cross sectional view of a dual bearing reel according to an embodiment of the present invention.

As shown in FIG. 1, a dual-bearing reel in which an embodiment of the present invention is adapted is a lever drag reel, and includes a cylindrical reel unit 1, a spool shaft 2 rotatively mounted in the central part of the reel unit 1, a spool 3 rotatively but axially non-movably supported by the spool shaft 2, and a handle 4 disposed on a side of a reel unit 1. In addition, the lever drag reel includes, in the interior of the reel unit 1, a rotation transmission mechanism 6 that transmits the rotation of the handle 4 to the spool 3, a lever drag mechanism 7 that brakes the rotation of the spool 3 in the line release direction, a drag adjustment mechanism 8 that serves to move the lever drag mechanism 7 in the spool shaft 2 direction to adjust the drag force (brake force), and a reverse rotation prevention mechanism 9 that limits the rotation of the lever drag mechanism 7 in the line release direction.

As shown in FIG. 1, the reel unit 1 includes a left/right pair of plate-shaped side plates 10, 11 made of metal, and an apertured cylindrical reel body 12 made of metal to which the side plates 10, 11 are coaxially joined to both ends thereof by spigot joints and fixed thereto by a plurality of bolt members 13. A pair of harness lugs 14 that are used for allowing the fisherman to support the reel with the body are mounted in between the side plates 10, 11 and the reel body 12. The side plates 10, 11 rotatively support both ends of the spool shaft 2 at their approximate central portions. The frame width of the side plates 10, 11 is formed to be smaller than conventional ones because the axial length of the spool 3 is formed to be small. A cylindrical bearing accommodation portion 10a that projects inward is formed in the central portion of the inside surface of the left side plate 10. A boss portion 11a that projects axially outward and serves to support the spool shaft 2 is formed in the central portion of the side plate 11 on the handle 4 side (the right side of FIG. 1).

Figure 2:
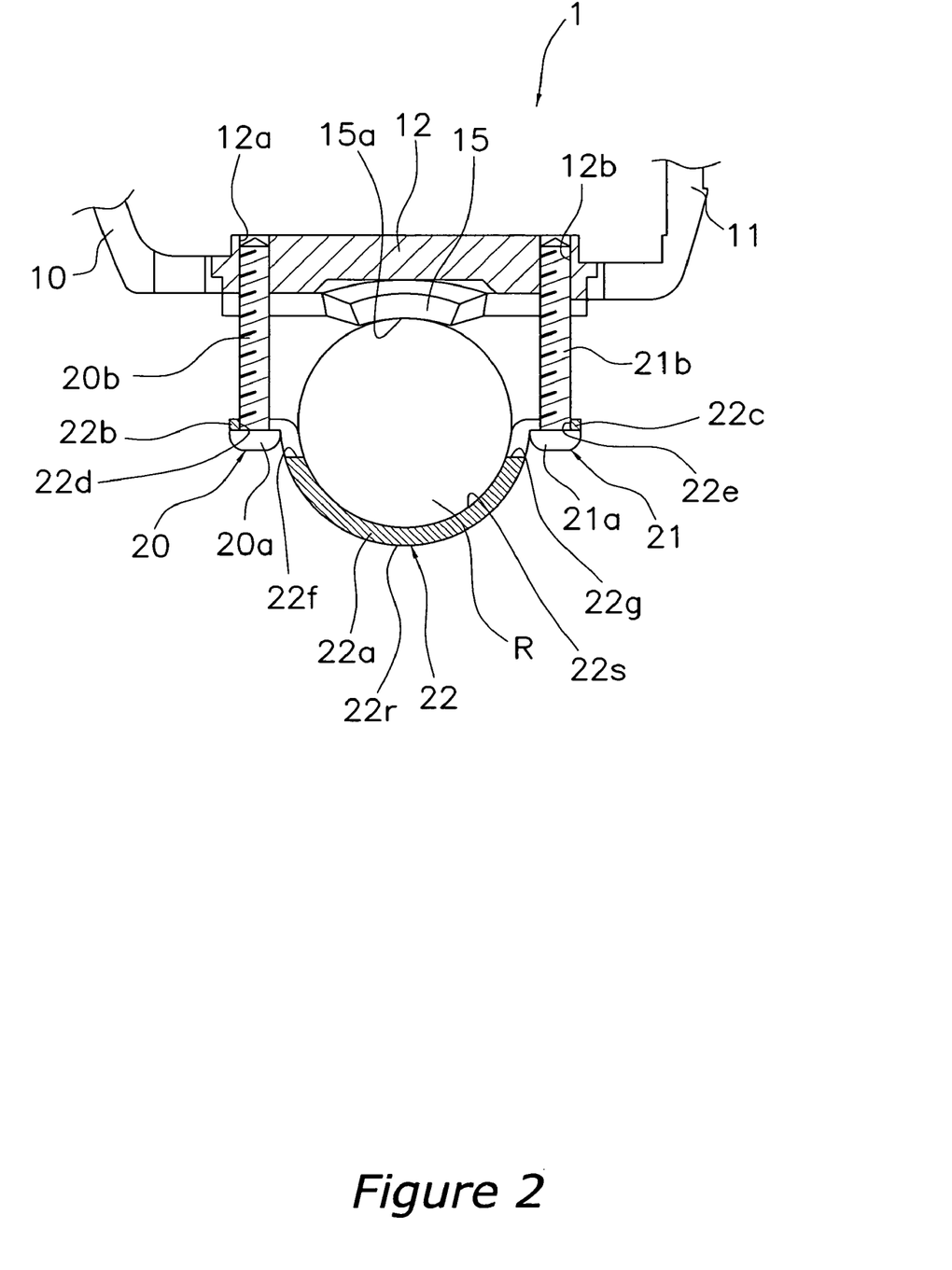
FIG. 2 is a cross sectional view of a rod clamp according to the embodiment of the present invention.

As shown in FIG. 1 and FIG. 2, a rod attachment leg 15 that serves to mount the reel on a fishing rod R is arranged on the lower portion of the reel body 12. The rod attachment leg 15 is made from a metal, and has a curved surface 15a that contacts the fishing rod R. Furthermore, a rod clamp 22 that serves to grasp the fishing rod R between the rod attachment leg 15 and the rod clamp 22 is arranged on the lower portion of the reel body 12. The rod clamp 22 is fixedly coupled to the reel body 12 by bolt members 20, 21 (one example of the first fixing member and the second fixing member).

As shown in FIG. 2, the bolt members 20, 21 include large diameter head portions 20a, 21 a that are mounted from below of the rod clamp 22, and shaft portions 20b, 21b that screw into the screw holes 12a, 12b (one example of the first attachment portion and the second attachment portion) formed in the lower portion of the reel body 12. Male threads are formed on the outer periphery of the shaft portions 20b, 21b, and female threads are formed on the inner periphery of the screw hole 12a, 12b.

As shown in FIG. 2, the rod clamp 22 serves to grasp the fishing rod R between the rod attachment leg 15 and the rod clamp 22. As shown in FIG. 2 to FIG. 5, the rod clamp 22 includes a retaining portion 22a having a curved surface 22s that conforms to the outer periphery of the fishing rod R, a first fixing portion 22b and a second fixing portion 22c that are respectively arranged on both sides of the retaining portion 22a and which include through holes 22d, 22e to which the bolt members 20, 21 are detachably and fixedly coupled, and cut-outs 22f, 22g (one example of the first release portion and second release portion). The cut-outs 22f, 22g are formed on both sides of an outer peripheral surface 22r of the retaining portion 22a so as to define through holes that extend through the retaining portion 22a on the outer peripheral surface 22r of the retaining portion 22a. The cut-outs 22f, 22g are respectively formed integrally with the through holes 22d, 22e, such that portions of the head portions 20a, 21a of the bolt members 20, 21 are inserted in the cut-outs 22f, 22g.

Figure 3:
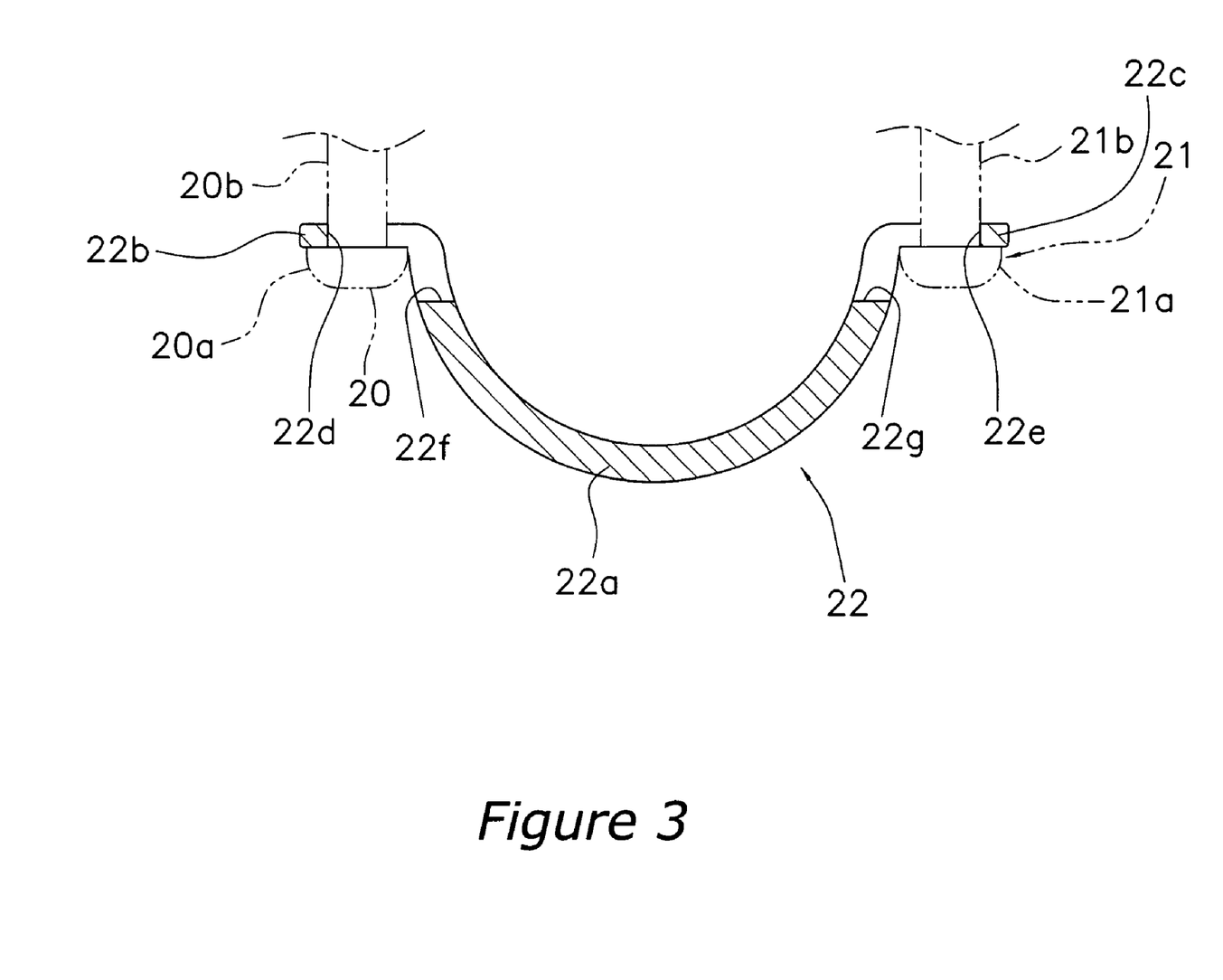
FIG. 3 is an enlarged cross sectional view of the rod clamp according to the embodiment of the present invention.

As shown in FIG. 1 to FIG. 3, the retaining portion 22a is a member whose cross-section is curved into an approximate arc shape so that a portion of the outer shape of the fishing rod R contacts therewith. The retaining portion 22a is unitarily formed with the first fixing portion 22b and the second fixing portion 22c by press working a stainless steel alloy. Both end portions of the retaining portion 22a are smoothly continuous with the first fixing portion 22b and the second fixing portion 22c.

Figure 4:
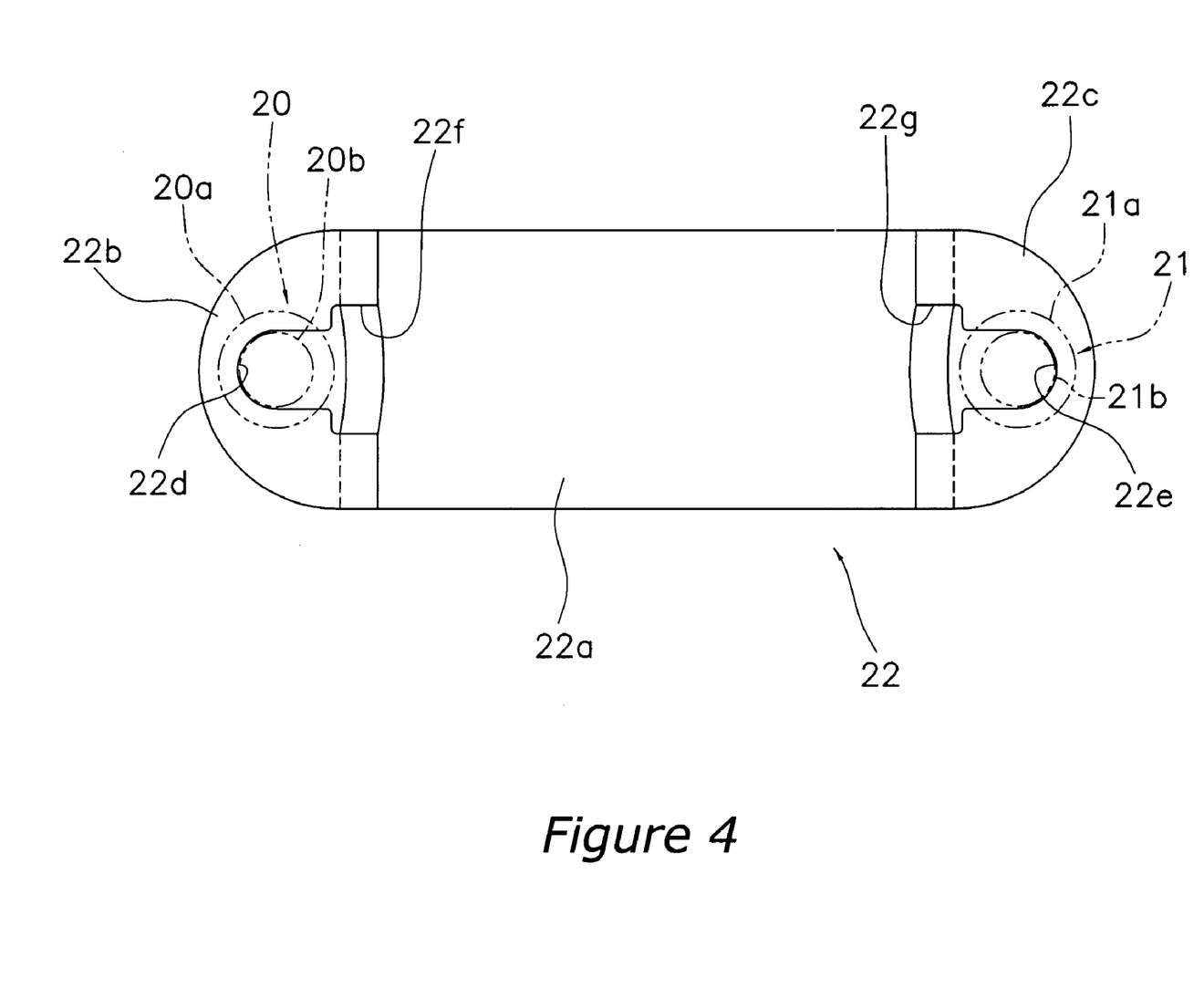
FIG. 4 is a plan view of the rod clamp according to the embodiment of the present invention.
Figure 5:
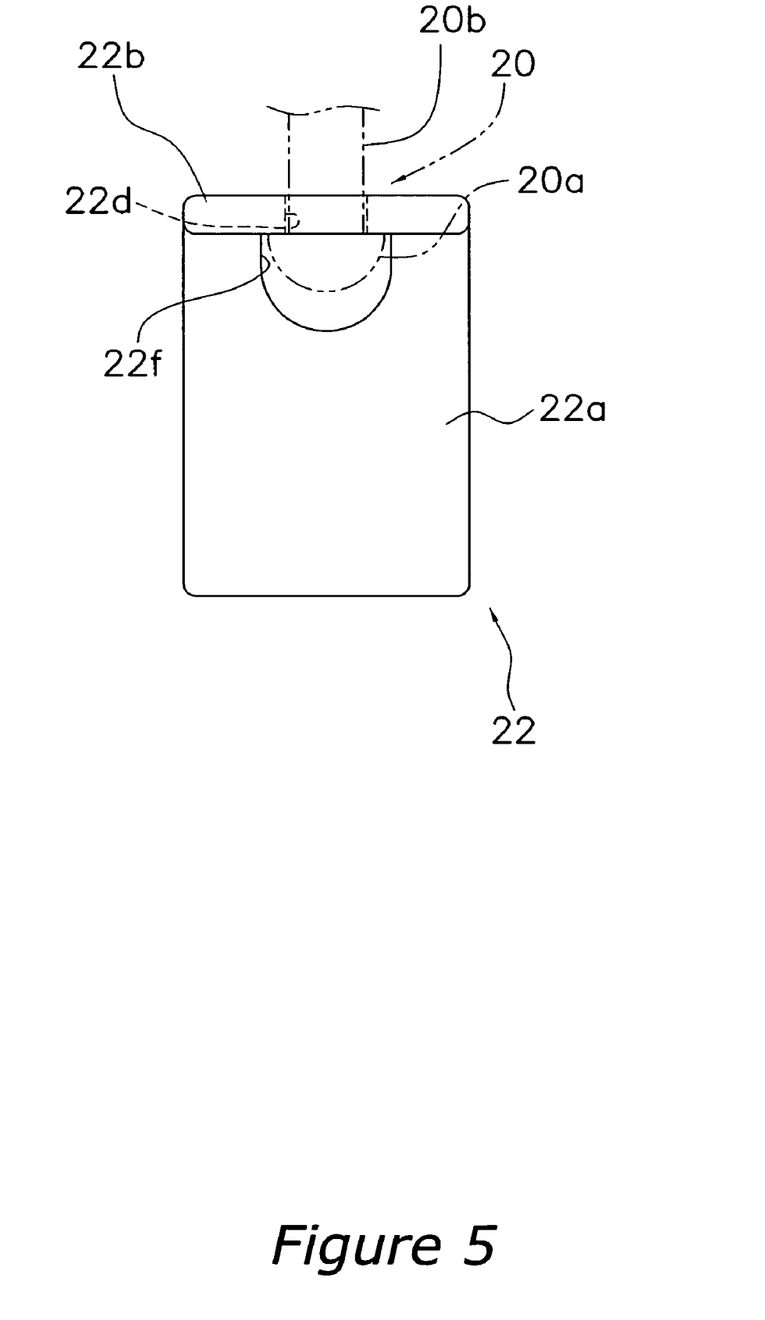
FIG. 5 is a side view of the rod clamp according to the embodiment of the present invention.

As shown in FIG. 3 to FIG. 5, the first fixing portion 22b and the second fixing portion 22c are plate shaped members that are symmetrically formed, and the end portions thereof are approximately semi-circular in shape. The through holes 22d, 22e are formed in the first fixing portion 22b and the second fixing portion 22c and pass therethrough in the vertical direction.

As shown in FIG. 2, the through holes 22d, 22e communicate with the screw holes 12a, 12b of the reel body 12. In other words, bolt members 20, 21 can be inserted through the through holes 22d, 22e and threadedly coupled to the screw holes 12a, 12b of the reel body 12. The first fixing portion 22b and the second fixing portion 22c are in this way fixedly coupled to the reel body 12 by mounting the aforementioned bolt members 20, 21 from the lower side. As shown in FIG. 3 to FIG. 5, the through holes 22d, 22e are formed in approximate semicircular shapes with diameters that are smaller than those of the head portions 20a, 21 a of the bolt members 20, 21 and larger than those of the shaft portions 20b, 21b. The through holes 22d, 22e are formed integrally with the cut-outs 22f, 22g of the retaining portion 22a.

As shown in FIG. 3 to FIG. 5, the cut-outs 22f, 22g pass through both sides of the retaining portion 22a in the horizontal direction with approximately semi-circular cross-sections to form elongated bores that communicate with the through holes 22d, 22e of the first fixing member 22b and the second fixing member 22c. As shown in FIG. 4 and FIG. 5, the cut-outs 22f, 22g are formed such that their widths are larger than the diameters of the head portions 20a, 21 a of the bolt members 20, 21. As shown in FIG. 3 and FIG. 5, the cut-outs 22f, 22g are formed so as to be longer than the heights in the axial direction of the head portions 20a (top-bottom direction of FIG. 3), 21 a of the bolt members 20, 21. Because of this, when the bolt members 20, 21 are mounted in the first fixing portion 22b and the second fixing portion 22c, portions of the head portions 20a, 21 a of the bolt members 20, 21 (the right end portion of the head portion 20a of the bolt member 20, and the left end portion of the head portion 21a of the bolt member 21) can be partially inserted into the cut-outs 22f, 22g. Also, when the bolt members 20, 21 are loosened, the entirety of the head portions 20a, 21 a can slide into the cut-outs 22f, 22g. Note that the through holes 22d, 22e and the cut-outs 22f, 22g are respectively formed as one long hole by a machining process such as blanking, cutting, and the like.

In using this type of rod clamp 22 to couple the fishing rod R to the reel, the lower portion of the fishing rod R is brought into contact with and grasped with the retaining portion 22*a* of the rod clamp 22 with the upper portion of the fishing rod R being kept in contact with the rod attachment leg 15. Then, the bolt members 20, 21 pass through the through holes 22*d*, 22*e* of the first fixing portion 22*b* and the second fixing portion 22*c*, and are screwed into the screw holes 12*a*, 12*b* of the reel body 12. Thus, the rod clamp 22 is fixedly coupled to the reel body 12, and the fishing rod R is grasped between the rod attachment leg 15 and the rod clamp 22.

In addition, to remove this type of rod clamp 22 from the reel body 12, both of the bolt members 20, 21 will be loosened. Next, when one of the bolt members 20, 21 is completely removed (for example, bolt member 20), the fishing rod R will be released. Then, when the other of the bolt members 20, 21 (for example, bolt member 21) is slid within the corresponding cutout (for example, cut-out 22*g*), the rod clamp 22 can be removed with the other of the bolt members 20, 21 (for example, bolt member 21) remaining coupled to the screw hole (for example, screw hole 12*b*) of the reel body 12.

With this type of rod clamp 22, when the bolt members 20, 21 are mounted in the first fixing portion 22*b* and the second fixing portion 22*c*, portions of the head portions 20*a*, 21*a* of the bolt members 20, 21 can be partially inserted into the cut-outs 22*f*, 22*g*, and thus the bolt members 20, 21 can be prevented from interfering with the retaining portion 22*a*, and the rod clamp 22 can be reliably attached to the reel unit 1 in which the frame width of the side plates 10, 11 is small.

Other Embodiments

Figure 6:
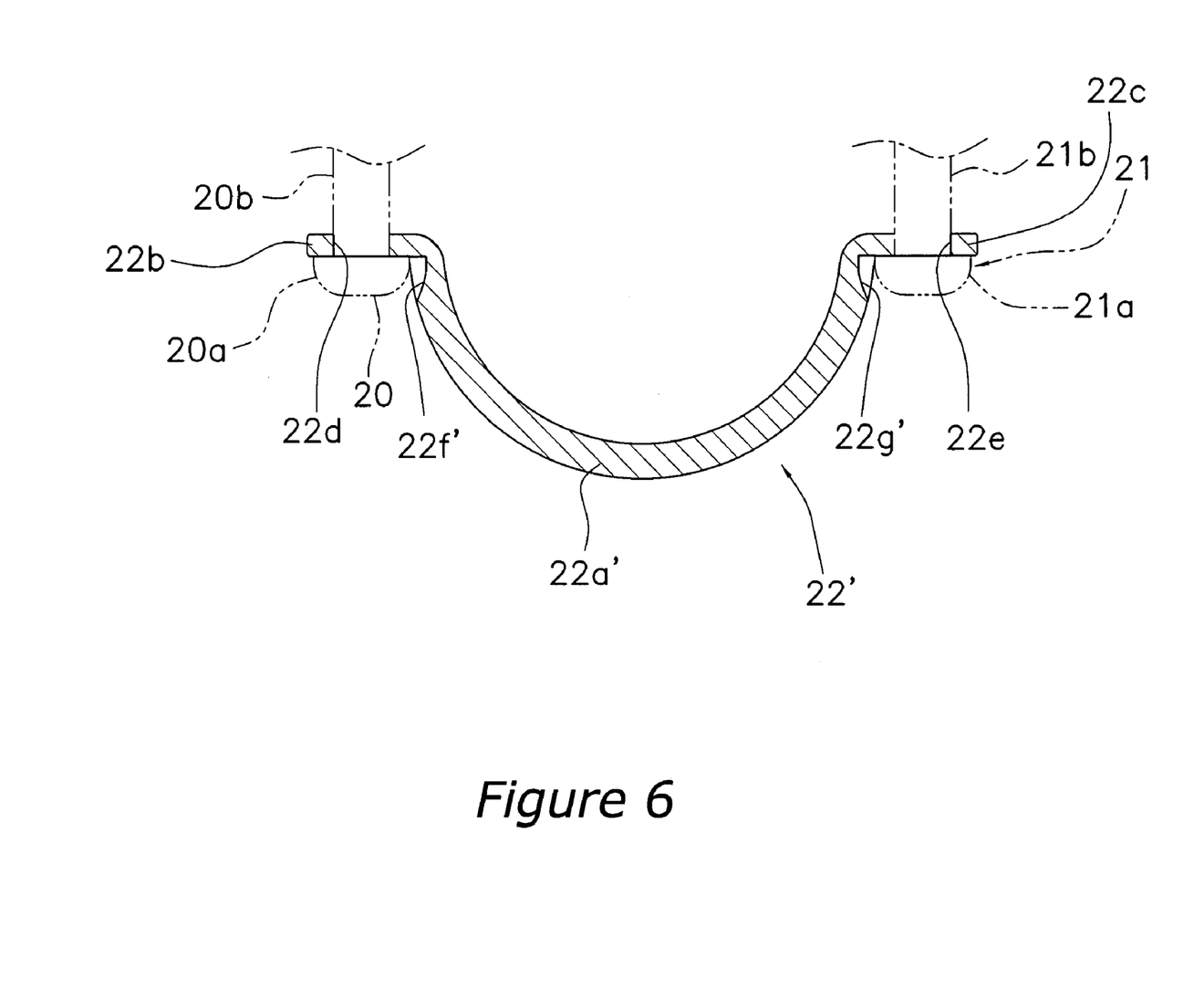
FIG. 6 is an enlarged cross sectional view of a rod clamp according to another embodiment of the present invention.
Figure 7:
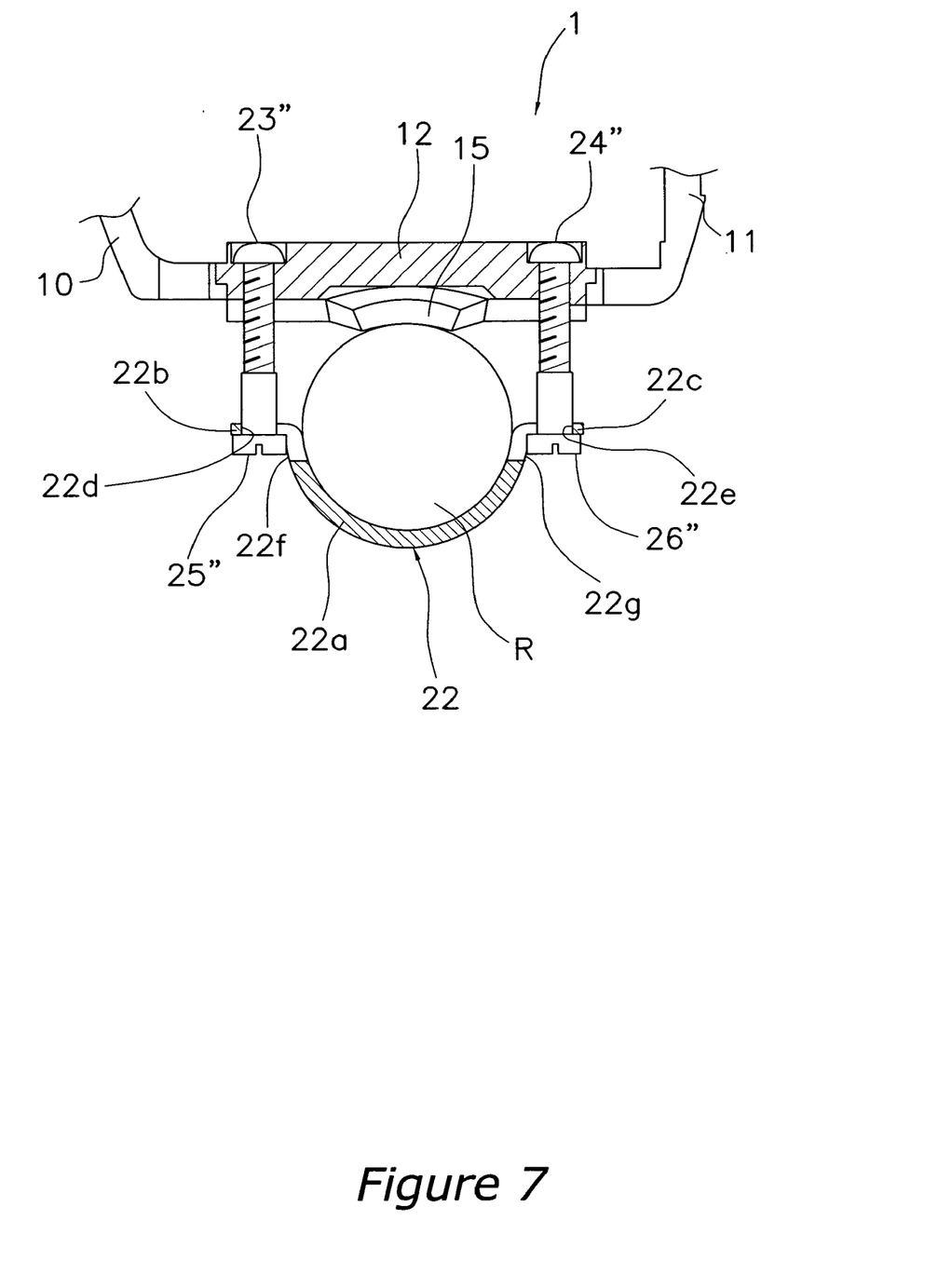
FIG. 7 is a cross sectional view of a rod clamp according to still another embodiment of the present invention.

Referring now to FIGS. 6 and 7, a rod clamp in accordance with alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiments that are identical to the parts of the first embodiment may be omitted for the sake of brevity. The parts of the alternate embodiments that differ from the parts of the first embodiment will be indicated with a prime (') or a double prime (").

(a) In the aforementioned embodiment, a dual-bearing reel was used to illustrate the fishing reel in which the rod clamp 22 is mounted. However, the present invention can also be applied to spinning reels or single-bearing reels.

(b) In the aforementioned embodiment, the cut-outs 22*f*, 22*g* are formed integrally with the through holes 22*d*, 22*e* of the first fixing portion 22*b* and the second fixing portion 22*c*. However, each of the cut-outs 22*f*, 22*g* and the through holes 22*d*, 22*e* may be separately provided. In addition, in the aforementioned embodiment, the cut-outs 22*f*, 22*g* are provided as the first release portion and the second release portion. Instead, as seen in FIG. 6, the first and second release portions may be recessed portions 22*f*' and 22*g*' that are formed recessed inward on both sides of the retaining portion 22*a*'. In this case, both of the bolt members 20 and 21 have to be disengaged from the screws 12*a* and 12*b* to remove the rod clamp 22' from the reel body 12.

(c) In the aforementioned embodiment, the retaining portion 22*a*, the first fixing portion 22*b*, and the second fixing portion 22*c* are unitarily formed by press working a stainless steel alloy. However the materials of the retaining portion 22*a*, the first fixing portion 22*b*, and the second fixing portion 22*c* and the method of making them are not limited to those of the aforementioned embodiment.

(d) In the aforementioned embodiment, the bolt members 20, 21 pass through the through holes 22*d*, 22*e* of the rod clamp 22, and are screwed into the screw holes 12*a*, 12*b* of the reel body 12. However, as shown in FIG. 7, bolt members 23", 24" may be mounted from above the reel body 12, and screwed into nut members 25", 26" mounted on the rod clamp 22 from below.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

According to the present invention, the rod clamp can be reliably attached to a reel body having a small frame width, because the rod clamp includes the first release portion and the second release portion that are respectively arranged on the sides near the first fixing portion and the second fixing portion of the retaining portion, and at least a portion of the first fixing member and the second fixing member can be inserted into the first release portion and second release portion when the first fixing member and the second fixing member are mounted in the first fixing portion and the second fixing portion.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-287255. The entire disclosure of Japanese Patent Application No. 2003-287255 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A rod clamp that is adapted to be detachably attached to first and second attachment portions of a reel unit for grasping a fishing rod between the rod clamp and a rod attachment leg of the reel unit, the first and second attachment portions being arranged on both sides of the rod attachment leg of the reel unit, the rod clamp comprising:

a retaining portion configured to grasp the fishing rod between the rod attachment leg and the retaining portion, the retaining portion having an inner curved surface configured and arranged to contact an outer periphery of the fishing rod;

first and second fixing portions respectively arranged on first and second sides of the retaining portion and configured to be coupled to the first and second attachment portions of the reel unit to detachably couple the retaining portion to the reel unit, each of the first and second fixing portions having a through hole, the retaining portion having first and second cut-outs formed on the first and second sides of the retaining portion, respectively, so as to extend through the retaining portion from an outer peripheral surface of the retaining portion to the inner curved surface, each of the first and second cut-outs forming an open area that is in communication with an open area formed by a respective one of the through holes of the first and second fixing portions; and first and second fixing members with which the first and second fixing portions are respectively adapted to be detachably coupled to the first and second attachment portions of the reel unit, the first and second fixing members being at least partially disposed within the first and second cut-outs, respectively, when the first and second fixing portions are coupled to the first and second attachment portions of the reel unit with the first and second fixing members.

2. The rod clamp set forth in claim 1, wherein
the first fixing member includes a first shaft portion that is adapted to be screwed into the first attachment portion, and a first head portion that is provided with a diameter larger than that of the first shaft portion, the first head portion being at least partially disposed within the first cut-out when the first fixing portion is coupled to the first attachment portion of the reel unit with the first fixing member, and
the second fixing member includes a second shaft portion that is adapted to be screwed into the second attachment portion, and a second head portion that is provided with a diameter larger than that of the second shaft portion, the second head portion being at least partially disposed within the second cut-out when the second fixing portion is coupled to the second attachment portion of the reel unit with the second fixing member.

3. The rod clamp set forth in claim 2, wherein
the first and second cut-outs are sized to accommodate the first and second head portions of the first and second fixing members when the first and second fixing portions are coupled to the first and second attachment portions of the reel unit with the first and second fixing members.

4. The rod clamp set forth in claim 1, wherein
the first fixing member and the second fixing member respectively pass through the through holes of the first and second fixing portions.

5. The rod chimp set forth in claim 1, wherein
the retaining portion and the first and second fixing portions are made of a stainless steel alloy.

6. The rod clamp set forth in claim 1, wherein
the retaining portion and the first and second fixing portions are unitarily formed as a one-piece member by press working.

7. The rod clamp set forth in claim 1, wherein
the first fixing member includes a first shaft portion, a first head portion that is provided with a diameter larger than that of the first shaft portion, and a first nut portion to which the first shaft portion is screwed such that the first nut portion is at least partially disposed within the first cut-out when the first fixing member is coupled to the first attachment portion of the reel unit via the first fixing portion, and the second fixing member includes a second shaft portion, a second head portion that is provided with a diameter larger than that of the second shaft portion, and a second nut portion to which the second shaft portion is screwed such that the second nut portion is at least partially disposed within the second cut-out when the second fixing member is coupled to the second attachment portion of the reel unit via the second fixing portion.

8. A fishing reel comprising:
a reel unit having a rod attachment leg and first and second attachment portions for grasping a fishing rod, each of the first and second attachment portions being arranged on a respective side of the rod attachment leg;
a spool shaft rotatively mounted in the reel unit;
a spool rotatively supported by the spool shaft;
a handle disposed on a side of the reel unit; and
a rod clamp including
a retaining portion configured to grasp a fishing rod between the rod attachment leg and the retaining portion, the retaining portion having an inner curved surface configured and arranged to contact an outer periphery of the fishing rod, and
first and second fixing portions respectively arranged on first and second sides of the retaining portion and coupled to the first and second attachment portions of the reel unit to detachably couple the retaining portion to the reel unit, each of the first and second fixing portions having a through hole,
the retaining portion having first and second cut-outs formed on first and second sides of the retaining portion, respectively, so as to extend through the retaining portion from an outer peripheral surface of the retaining portion to the inner curved surface, each of the first and second cut-outs forming an open area that is in communication with an open area formed by a respective one of the through holes of the first and second fixing portions.

9. The fishing reel as set forth in claim 8, further comprising
first and second fixing members with which the first and second fixing portions are respectively coupled to the first and second attachment portions of the reel unit, the first and second fixing members being at least partially disposed within the first and second cut-outs, respectively.

10. The fishing reel as set forth in claim 9, wherein
the first fixing member includes a first shaft portion that is screwed into the first attachment portion, and a first head portion that is provided with a diameter larger than that of the first shaft portion, the first head portion being at least partially disposed within the first cut-out, and
the second fixing member includes a second shaft portion that is adapted to be screwed into the second attachment portion, and a second head portion that is provided with a diameter larger than that of the second shaft portion, the second head portion being at least partially disposed within the second cut-out.

11. The fishing reel as set forth in claim 10, wherein
the first and second cut-outs are sized to accommodate the first and second head portions of the first and second fixing members.

12. The fishing reel as set forth in claim 9, wherein
the first fixing member and the second fixing member respectively pass through the through holes of the first and second fixing portions.

13. The fishing reel as set forth in claim 9, wherein
the first fixing member includes a first shaft portion, a first head portion that is provided with a diameter larger than that of the first shaft portion, and a first nut portion to which the first shaft portion is screwed such that the first nut portion is at least partially disposed within the first cut-out, and the second fixing member includes a second shaft portion, a second head portion that is provided with a diameter larger than that of the second shaft portion, and a second nut portion to which the second shaft portion is screwed such that the second nut portion is at least partially disposed within the second cut-out.

14. The fishing reel as set forth in claim 13, wherein
the retaining portion and the first and second fixing portions are made of a stainless steel alloy.

15. The fishing reel as set forth in claim 8, wherein
the retaining portion and the first and second fixing portions are unitarily formed as a one-piece member by press working.

* * * * *